United States Patent [19]

Chomel et al.

[11] 4,251,186
[45] Feb. 17, 1981

[54] DEVICE TO CIRCULATE A FLUID IN A HOLLOW SHAFT

[75] Inventors: Roger Chomel, Venissieux; Gérard Martin, Chassieu; Georges Viallon, Saint Priest, all of France

[73] Assignee: Automobiles M. Berliet, Lyons, France

[21] Appl. No.: 949,215

[22] Filed: Oct. 6, 1978

[30] Foreign Application Priority Data

Oct. 7, 1977 [FR] France ................. 77 30785

[51] Int. Cl.³ ............... F04D 29/44; F16N 13/20; F16C 1/24
[52] U.S. Cl. ................ 415/210; 415/213 R; 184/31; 308/84; 308/86; 308/107
[58] Field of Search ........... 415/210, 213 R, 111, 415/501, 112, 115; 184/31, 43; 308/93, 107, 84, 86, 127, 121

[56] References Cited

U.S. PATENT DOCUMENTS

| 1,004,853 | 10/1911 | Crooks | 308/86 |
| 2,332,614 | 10/1943 | Swearingen | 308/121 X |
| 3,213,798 | 10/1965 | Carswell | 415/112 |
| 3,857,462 | 12/1974 | Kaufman et al. | 308/86 X |
| 4,071,303 | 1/1978 | Guidez | 308/107 X |

Primary Examiner—Leonard E. Smith
Attorney, Agent, or Firm—Remy J. VanOphem

[57] ABSTRACT

A device to circulate lubricating oil by radial penetration of the oil into a revolving hollow shaft to lubricate isolated components. The device has a stator and a rotor within a chamber in the stator. Both the stator and rotor are fixed to the shaft. The rotor has a plurality of radial holes. The hollow shaft also has a radial hole which communicates with the internal bore in the shaft. When the shaft is rotated, centrifugal forces act on the oil in the radial holes so as to drive the oil into the chamber and to draw oil through a port around the shaft in the stator. The centrifugal forces also act on any oil in the radial hole so as to tend to drive the oil into the chamber. However, these centrifugal forces are overcome by the pressure forcing the oil into the chamber. Thus, the oil pressure in the chamber drives the oil into the radial hole into the internal bore of the hollow shaft to lubricate isolated components.

9 Claims, 9 Drawing Figures

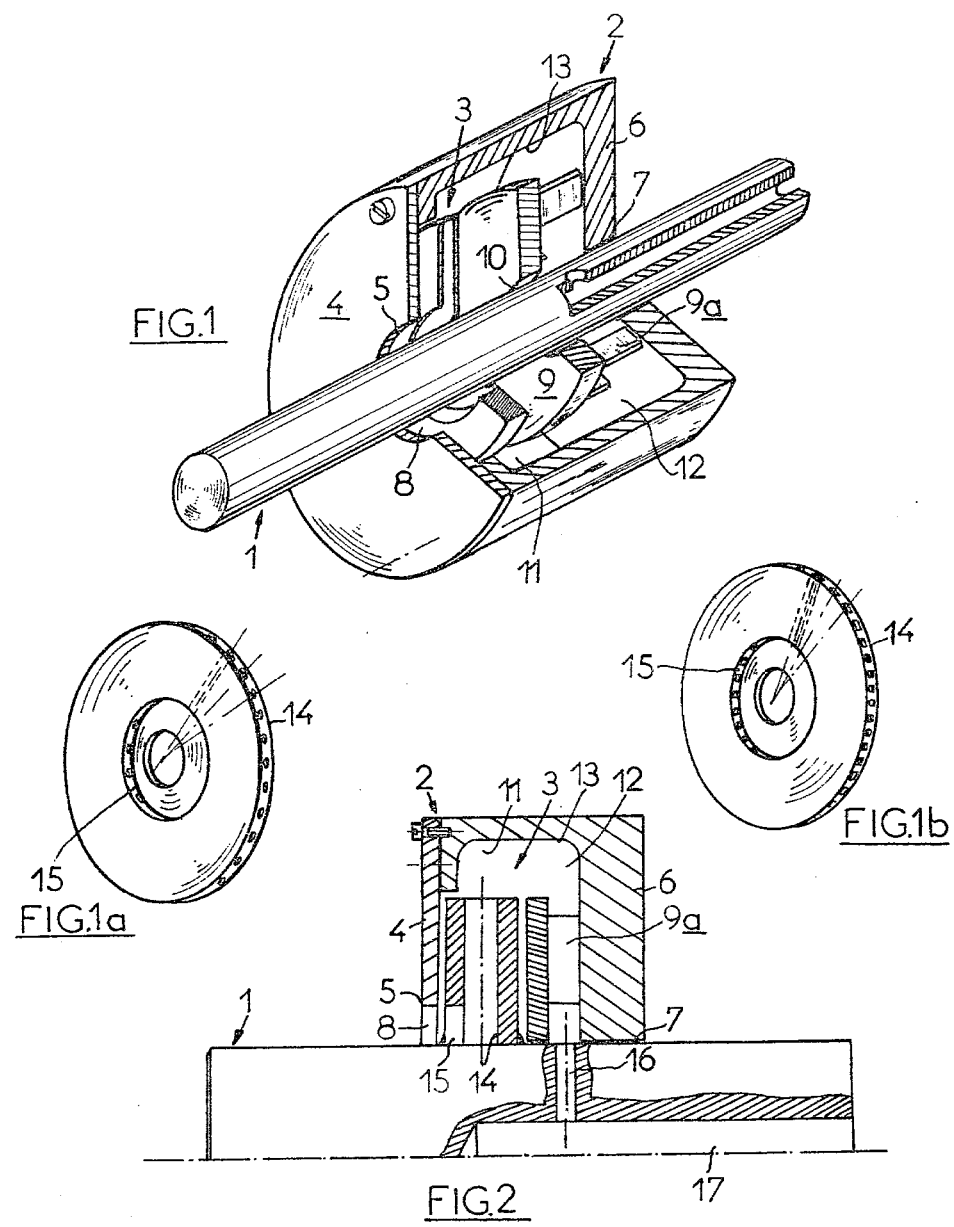

DEVICE TO CIRCULATE A FLUID IN A HOLLOW SHAFT

BACKGROUND OF THE INVENTION

1. Field of the Invention

The present invention concerns a device to circulate oil within a hollow shaft which revolves in an oil bath.

2. Description of the Prior Art

It is known that the lubrication of certain mechanical parts of gearboxes for vehicles or similar machines necessitates a penetration of oil into a hollow revolving shaft. Given that the centrifugal forces arise because the rotation of the shaft tends naturally to oppose the penetration of the oil into the hollow shaft, this lubrication is difficult to bring about by the conventional means of lubrication by immersion in the oil and the collection of oil splashes within a casing, and necessitates the oil being put under pressure.

When the output and the number of points to be lubricated in this way are large, the incorporation of a pressure lubricating assembly with a feed pump and distribution channels may be justified. On the other hand, when it is a question of lubricating an isolated component, it is advantageous to use a more compact device in order to carry out lubrication.

There exist a number of such prior art systems of small size and of the type with a built-in volumetric pump (vane, profile, gear, piston or other pumps). These systems present numerous disadvantages. For example, they comprise components rubbing one against another which are subject to wear and which are very sensitive to operating conditions, by being adversely affected by misalignments and the presence of impurities in the oil. In addition, so that these systems may operate in any direction of rotation of the hollow shaft, valves must be provided, further complicating the mechanism.

SUMMARY OF THE INVENTION

The invention has the aim of achieving a device which allows the circulation of the oil inside a revolving hollow shaft without using components in frictional contact with one another, so that the device is unaffected by wear and may operate even with polluted oil.

The invention also has the aim of achieving a device for circulating oil within a hollow shaft, which is capable of operating without a valve whatever the direction of rotation of the shaft.

A device according to the invention to circulate oil within a hollow shaft rotating about its axis is characterised in that it comprises:

a fixed stator co-axial with the hollow shaft which passes through it, and comprising on the one hand a transverse face known as the opened face, of which the central hole is of a diameter much larger than the exterior diameter of the hollow shaft at this point, so as to define a gap between the said transverse face and the shaft, and on the other hand a transverse face known as the closed face, of which the central hole is of a diameter only slightly greater than the exterior diameter of the shaft at this point;

an annular transverse separating wall adjacent to the shaft, which defines within the fixed stator on the one side an annular intake chamber located on the side of the transverse opened face of the stator, and on the other side an annular compression chamber located on the side of the closed transverse face of the stator, these two chambers being in communication with each other by a space formed between the circumference of the separating wall and the internal cylindrical surface of the stator;

a rotor attached to the shaft, which turns inside the intake chamber;

a channel which links in the hollow shaft the hollow center of the shaft to an opening on the external surface of the shaft inside the compression chamber.

According to an additional characteristic of the invention, the separating wall is fixed to the stator and comprises a central hole slightly greater than the external diameter of the hollow shaft at this point.

According to an additional characteristic of the invention, the rotor is constituted by a disc provided with radial channels, either by drilling within the thickness of the disc or in the form of fins, and which has an opening opposite the gap in the opened face of the stator.

According to an additional characteristic of the invention, the clearances provided between the revolving shaft and the fixed components of the device, namely the stator and the separating wall, are sufficiently large in order to prevent metal-to-metal contact of these components, even in the case of a slight misalignment.

The attached drawings, given by way of non-limiting example, will allow the characteristics of the invention to be better understood.

BRIEF DESCRIPTION OF THE DRAWINGS

FIG. 1 is a view of a device according to the invention.

FIGS. 1a and 1b show two types of rotor for the device.

FIG. 2 is an axial section view of this device.

DESCRIPTION OF THE PREFERRED EMBODIMENT

Figure 3:
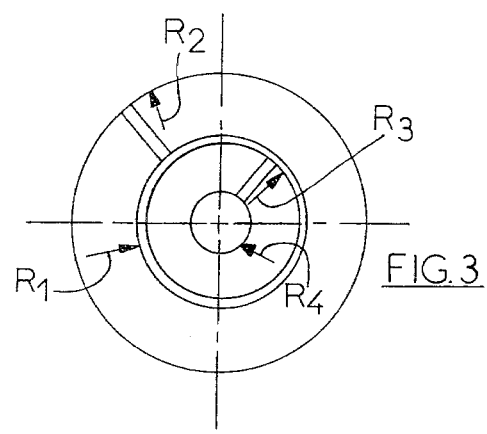
FIGS. 3 and 4 are two views accompanying the demonstration of the theoretical conditions of operation of the device.

There is shown in FIGS. 1 and 2 a device according to the invention fitted to a hollow revolving shaft 1. The device essentially comprises a stator 2 attached to a fixed component located near the shaft 1, and a rotor 3 attached to the shaft 1.

The stator 2 is closely co-axial with the shaft 1 and comprises on the one hand a flat transverse face 4 known as the opened face of which the central hole 5 is of a much larger diameter than the exterior diameter of the shaft 1 at this point, and on the other hand a flat transverse closed face 6 of which the central hole 7 is of a diameter only slightly larger than the exterior diameter of the shaft 1 at this point. The face 4 of the stator is made detachable, for reasons of assembly, and an annular gap 8 is defined in the hole 5 of this face by the shaft 1. The stator 2 is additionally attached to a flat internal annular transverse separating wall 9 of which the central hole 10 is of a diameter slightly larger than the exterior diameter of the shaft 1 at this point. This interior separating wall 9 defines within the fixed stator 2 on the one side an annular intake chamber 11 located on the side of the opened face 4, and on the other side an annular compression chamber 12 located on the side of the closed face 6 of the stator. The two chambers 11 and 12 communicate by a space formed between the periphery of the separating wall 9 and the internal cylindrical surface 13 of the stator. The wall 9 is additionally connected to the stator by means of small ribs 9a which extend radially within the compression chamber 12. It will be seen that the shaft 1 in no way touches the fixed components of the device. The clearance provided between the shaft and the holes 7 and 10 respectively of the face 6 and the wall 5 is sufficiently large to prevent any metal-to-metal friction contact, even in the a slight misalignment.

The rotor 3 is constituted by a disc 14 provided with channels situated radially in relation to the shaft 1. This rotor 3 has an opening 15 opposite the gap 8 of the face 4. (See FIGS. 1a and 1b).

Finally the shaft 1 has a radial hole 16 which opens at one end into the hollow 17 of the shaft 1, and at the other end into the compression chamber 12, on the external face of the shaft 1.

The assembly described is located for example inside a casing, and is completely immersed in the lubricating oil.

The operation is as follows.

When the shaft 1 rotates, centrifugal forces act on a volume of oil enclosed in each radial channel so as to drive out some oil towards the periphery of the intake chamber 11. This rotation of the shaft also draws oil into the stator 2 through the port 15 and the annular gap 8. The expelled oil penetrates into the chamber 12 through the space defined between the periphery of the wall 9 and the internal surface of the stator so that this chamber 12 is put under pressure.

The centrifugal forces which act on the volume of oil enclosed in the radial hole 16 of the shaft 1 tend to drive the oil into the chamber 12. However, the assembly is designed so that these centrifugal forces are overcome by the pressure forcing the oil into the chamber 12. The oil in the chamber 12 is then driven into the hollow 17 of the shaft 1 through the radial hole 16.

Figure 4:
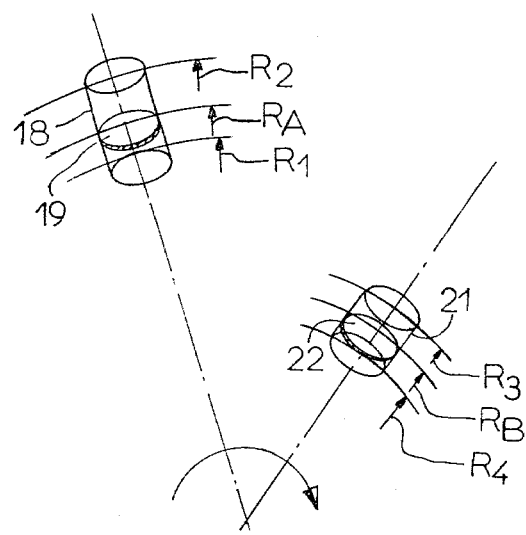

The following theoretical study precisely defines the operating conditions of the device according to the invention. (FIGS. 3 and 4).

For this study, the following data are used:

R1 and R2 are respectively the minimum and maximum radii of the volume of oil on which the centrifugal forces act within a radial channel of the disc 14.

R3 is the external radius of the shaft 1 at the level of the compression chamber 12.

R4 is the radius of the hollow 17 of the shaft 1.

a is the volumetric mass of the oil.

w is the angular speed of rotation of the shaft 1.

$S_A$ is the section of a column of oil 18 in a channel of the disc 14.

$dR_A$ is the thickness of a component 19 situated at a distance R from the axis of the shaft 1 in the column of oil 18, $dm_A$ being its mass.

$S_B$ is the section of a column of oil 21 in the radial hole 16.

$dR_B$ is the thickness of a component 22 situated at a distance $R_B$ from the axis in the column of oil 21, $dm_B$ being its mass.

$dF_A$ is the force of centrifugal inertia operating on the component 19.

$dF_B$ is the force of centrifugal inertia operating on the component 22.

These centrifugal forces may be determined by the following expressions:

$$dF_A = w^2 \cdot R_A \cdot dm_A = w^2 \cdot R_A \cdot a \cdot S_A \cdot dR_A = a \cdot w^2 \cdot S_A \cdot R_A \cdot dR_A$$

$$dF_B = w^2 \cdot R_B \cdot dm_B = w^2 \cdot R_B \cdot a \cdot S_B \cdot dR_B = a \cdot w^2 \cdot S_B \cdot R_B \cdot dR_B$$

At the top of the column 18, the pressure is as follows:

$$P_2 = \frac{F_A}{S_A} = \frac{1}{S_A} \int_{R1}^{R2} a \cdot w^2 \cdot S_A \cdot R_A \cdot dR = a \cdot w^2 \left( \frac{R2^2}{2} - \frac{R1^2}{2} \right)$$

At the top of the column 21, the pressure is as follows:

$$P_3 = \frac{F_B}{S_B} = \frac{1}{S_B} \int_{R4}^{R3} a \cdot w^2 \cdot S_B \cdot R_B \cdot dR = a \cdot w^2 \left( \frac{R3^2}{2} - \frac{R4^2}{2} \right)$$

P1 and P4 being respectively the pressures at the inlet of the column 18 and at the outlet of the column 21, the circulation of oil is established in the desired direction when:

$$R2^2 - R1^2 > R3^2 - R4^2$$

Except for pressure losses, the remaining pressure at the outlet of the column 21, that is to say in the hollow 17 of the shaft 1, is the following:

$$P4 = \frac{aw^2}{2}(R2^2 - R1^2 - R3^2 + R4^2) + P1$$

The device according to the invention finds application in mechanical transmissions, when the lubrication of certain points demands radial penetration of oil in the shafts. It may, for example, operate at the following points:

The pilot bearing between the drive shaft and the main shaft.

The bearing of loose pinions.

An assembly with all conical bearings in which the conical pilot bearing must be well lubricated and cooled.

Figure 5:
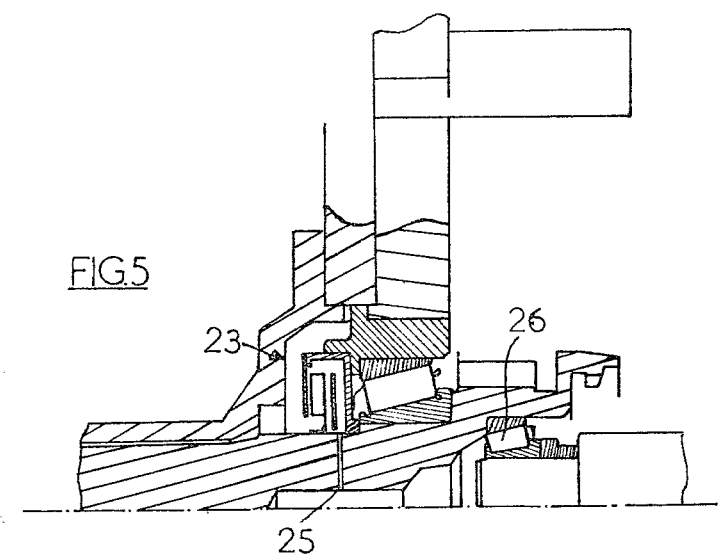
FIG. 5 is a part sectional view of a gearbox fitted with a device according to the invention.

The last example is illustrated in FIG. 5 where a device 23 according to the invention is placed near to the end of a hollow drive shaft 24 in order to send oil through a radial hole 25 in the shaft 24 so as to lubricate a bearing 26.

Figure 6:
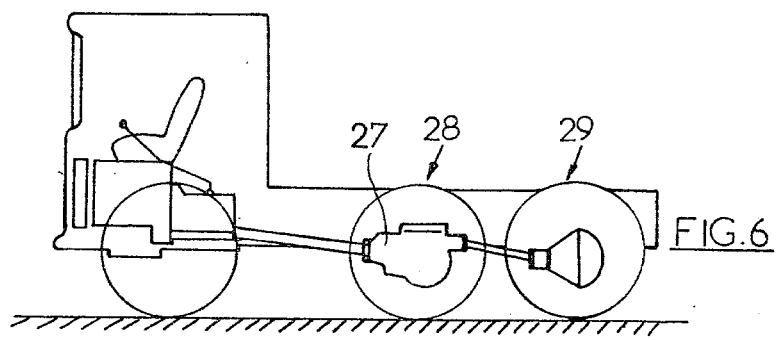
FIG. 6 is a side view in a vehicle of which the inter-axle differential is fitted with a device according to the invention.
Figure 7:
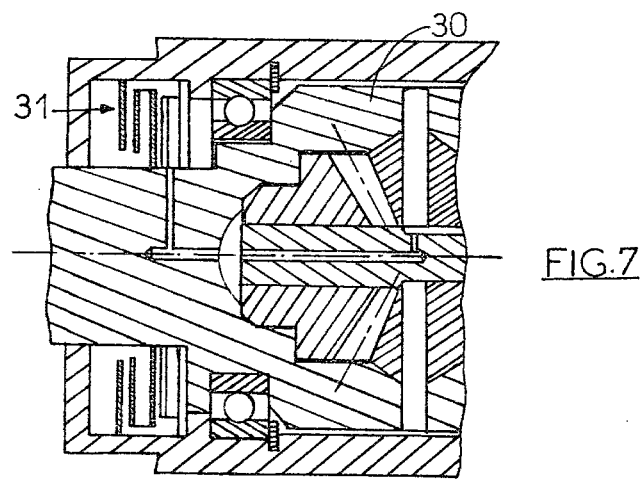
FIG. 7 is a part sectional view of the inter-axle differential shown in FIG. 6.

Likewise the device is particularly well adopted to lubricate the inter-axle differential 27 of a vehicle provided with several driving axles 28 and 29 (FIG. 6). In fact, it is difficult to make oil penetrate into the cages 30 of a differential (FIG. 7), the latter being driven at a great rotational speed. The device 31 according to the invention performs this lubrication.

The device according to the invention has the principal advantage of not including frictional components, which allows it to operate perfectly even in the following cases:

In the event of misalignment between the revolving shaft and the fixed stator.

Lubrication with polluted oil.

Rotation of the shaft in both directions.

What we claim is:

1. A device to circulate a fluid inside a hollow shaft rotating about its axis, characterised in that it comprises:
    a fixed stator comprising on the one hand a transverse face known as the opened face, of which the central hole has a diameter much larger than the external diameter of the hollow shaft at this point, so as to define a gap between the said transverse face and the shaft, and on the other hand a transverse face known as the closed face, of which the central hole is of a diameter slightly greater than the external diameter of the hollow shaft at this point;
    an annular transverse separating wall adjacent to the shaft and which defines inside the fixed stator on one side an annular intake chamber located on the side of the opened transverse face of the stator, and on the other side an annular compression chamber located on the side of the closed transverse face of the stator, these two chambers being in communication through a space defined between the periphery of the separating wall and the internal cylindrical surface of the stator;
    a rotor fixed to the shaft, turning inside the intake chamber; and
    a passage connecting the hollow shaft, the hollow of the shaft to an opening on the external face of the shaft, and opening into the compression chamber.

2. A device according to claim 1, characterised in that the separating wall is attached to the stator and comprises a central hole slightly larger than the external diameter of the hollow shaft at this point.

3. A device according to claim 2, wherein the clearance provided between the revolving shaft and the fixed components of the device are sufficiently large so as to be free of any metal to metal frictional contact between the components even in the event of slight misalignment between the components.

4. A device according to claim 1 characterised in that the clearance provided between the revolving shaft and the fixed components of the device are sufficiently large for there to be no metal-to-metal friction between the components, even in the event of a slight fault in alignment.

5. A device according to claim 4 characterised in that the rotor is constituted by a disc carrying on the one hand internal channels arranged radially in relation to the shaft, and on the other hand an opening, or relief located opposite the gap of the opened stator face.

6. A device according to claim 3 or 5, characterised in that the rotor and the hollow shaft are arranged in such a way as to satisfy the following condition:

$$R2^2 - R1^2 > R3^2 - R4^2$$

given that R1, R2, R3 and R4 are the radii, counted from the axis of the hollow shaft, of the following points respectively:
    the inlet end of the column of fluid situated in a radial channel of the rotor,
    the outlet end of this same column of fluid,
    the inlet end of the column of fluid situated in the passage of the hollow shaft,
    the outlet end of this same column of fluid.

7. A device according to claim 1 wherein said rotor is constituted by a disc carrying on one hand internal channels arranged radially in relation to the shaft, and on the other hand an opening, or relief located opposite the gap of the opened slator face.

8. A device according to claim 2 wherein said rotor is constituted by a disc carrying on one hand internal channels arranged radially in relation to the shaft, and on the other hand an opening, or relief located opposite the gap of the opened slator face.

9. A device according to claim 7 or 8 characterised in that the rotor and the hollow shaft are arranged in such a way as to satisfy the following condition:

$$R2^2 - R1^2 > R3^2 - R4^2$$

given that R1, R2, R3 and R4 are the radii, counted from the axis of the hollow shaft, of the following points respectfully:
    the inlet end of the column of fluid situated in a radial channel of the rotor,
    the outlet end of this same column of fluid,
    the inlet end of the column of fluid situated in the passage of the hollow shaft,
    the outlet end of this same column of fluid.

* * * * *

UNITED STATES PATENT AND TRADEMARK OFFICE
CERTIFICATE OF CORRECTION

PATENT NO. : 4,251,186
DATED : February 17, 1981
INVENTOR(S) : Roger Chomel et al.

It is certified that error appears in the above—identified patent and that said Letters Patent is hereby corrected as shown below:

Column 2, line 24, after the word "metal" insert ----friction----.

Column 3, line 14, after the word "the" insert ----event of----.

Column 4, line 15, delete ".dR =" and insert ----.$dR_A$ =----.

Column 4, line 25, delete ".dR =" and insert ----.$dR_B$ =----.

Signed and Sealed this

Fourteenth Day of July 1981

[SEAL]

Attest:

Attesting Officer

GERALD J. MOSSINGHOFF
Commissioner of Patents and Trademarks